(12) United States Patent
Lo et al.

(10) Patent No.: US 7,593,431 B1
(45) Date of Patent: Sep. 22, 2009

(54) METHOD AND SYSTEM FOR MONITORING A MAC EXTRA IPG COUNT AND ADJUSTING THE PHY TRANSMIT IPG

(75) Inventors: William Lo, Cupertino, CA (US); Samuel Er-Shen Tang, Cupertino, CA (US); Sabu Ghazali, Fremont, CA (US)

(73) Assignee: Marvell International Ltd., Hamilton (BM)

( * ) Notice: Subject to any disclaimer, the term of this patent is extended or adjusted under 35 U.S.C. 154(b) by 1354 days.

(21) Appl. No.: 10/329,196

(22) Filed: Dec. 23, 2002

Related U.S. Application Data

(60) Provisional application No. 60/378,975, filed on May 9, 2002.

(51) Int. Cl.
*H04J 3/12* (2006.01)
(52) U.S. Cl. .................................................... 370/528
(58) Field of Classification Search ................. 370/350, 370/412–421, 465–471, 463, 503–506, 509–514
See application file for complete search history.

(56) References Cited

U.S. PATENT DOCUMENTS

| 4,849,970 | A | * | 7/1989 | McCool ...................... 370/517 |
| 6,055,578 | A | * | 4/2000 | Williams et al. ............ 709/253 |
| 7,002,967 | B2 | * | 2/2006 | Denton et al. ............ 370/395.5 |
| 2001/0034729 | A1 | * | 10/2001 | Azadet et al. .................. 707/1 |
| 2001/0043603 | A1 | * | 11/2001 | Yu ............................... 370/393 |
| 2004/0028164 | A1 | * | 2/2004 | Jiang et al. .................. 375/371 |
| 2004/0071166 | A1 | * | 4/2004 | Yen et al. ..................... 370/472 |
| 2006/0133421 | A1 | * | 6/2006 | Homer et al. ................ 370/474 |

OTHER PUBLICATIONS (Feb. 20, 2002) "Media Access Control," *IEEE Draft P802.3ae/D4.1* Section 4, pp. 14-41.

* cited by examiner

*Primary Examiner*—Thai D Hoang

(57) ABSTRACT

A device for controlling interpacket gaps in a data stream of packets. A receiver to receive the data stream of packets. A controller to monitor the data stream of packets and to selectively delete interpacket gaps. A transmit buffer to buffer packet data in the data stream of packets flowing from the controller.

27 Claims, 4 Drawing Sheets

US 7,593,431 B1

METHOD AND SYSTEM FOR MONITORING A MAC EXTRA IPG COUNT AND ADJUSTING THE PHY TRANSMIT IPG

CROSS-REFERENCE TO RELATED APPLICATIONS

This application claims the benefit of the filing date of U.S. provisional application No. 60/378,975 filed May 9, 2002, the content of which is herein incorporated by reference in its entirety.

TECHNICAL FIELD

This invention relates to transceivers for interfacing between physical layer (PHY) devices and networks.

BACKGROUND

Systems that communicate information between networks conforming to different standards may require an interface device to reconcile incompatibilities between the networks. The network incompatibilities may include differences in frequency between the networks as well as the configuration of data packets. To compensate for frequency differences between the networks, the information stream of one network may be stretched by inserting extra interpacket gaps (IPG) so that the resulting transmission frequency is compatible with the other network. However, if too many extra IPG are inserted in the information stream the transmit FIFO of the transmitting network may be overflowed causing a transmission fault requiring resending one or more packets. To prevent a FIFO overflow, one or more IPG may be deleted. But if too many IPG are deleted, packets may be sent back to back causing a failure in the other end of the link partner or other end of the network partner.

SUMMARY

A device for controlling interpacket gaps in a data stream of packets. A receiver to receive the data stream of packets. A controller to monitor the data stream of packets and to selectively delete interpacket gaps. A transmit buffer to buffer packet data in the data stream of packets flowing from the controller.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
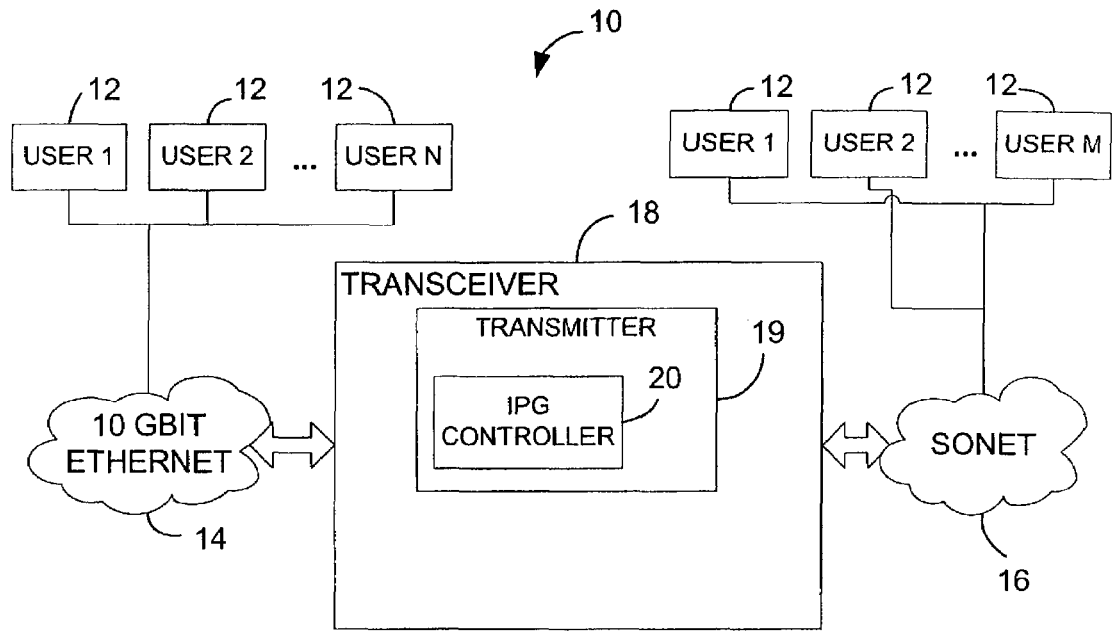
FIG. 1 is a block diagram of a communication system.

FIG. 1 shows a communication system 10 for communicating information between multiple users 12 connected to separate networks 14 and 16. The networks 14 and 16 are preferably a 10 Gigabit Ethernet (10GbE) network 14 and a Synchronous Optical NETwork (SONET) 16 that may support a WIS (WAN (wide area network) interface sublayer) mode. However, any combination including one or more packet-based networks may be employed. A transceiver 18 is coupled between the networks 14 and 16. In one direction, the transceiver 18 converts a data stream from a 10 Gbit Attachment Unit Interface (XAUI) to supply a 10 Gigabit data stream to the SONET 16. In the other direction, the transceiver 18 converts a 10 Gigabit data stream from the SONET 16 to supply a four-lane XAUI data stream to the GbE network 14. A transmitter 19 may insert extra IPG into the data stream that flows from the 10 GbE network 14 to match the expected transmit data rate and to provide separation between the packets. An IPG controller 20 may control the number of IPGs in the stream of packets to prevent overflows in the transmitter and packet corruption in the downstream receiver.

Figure 2:
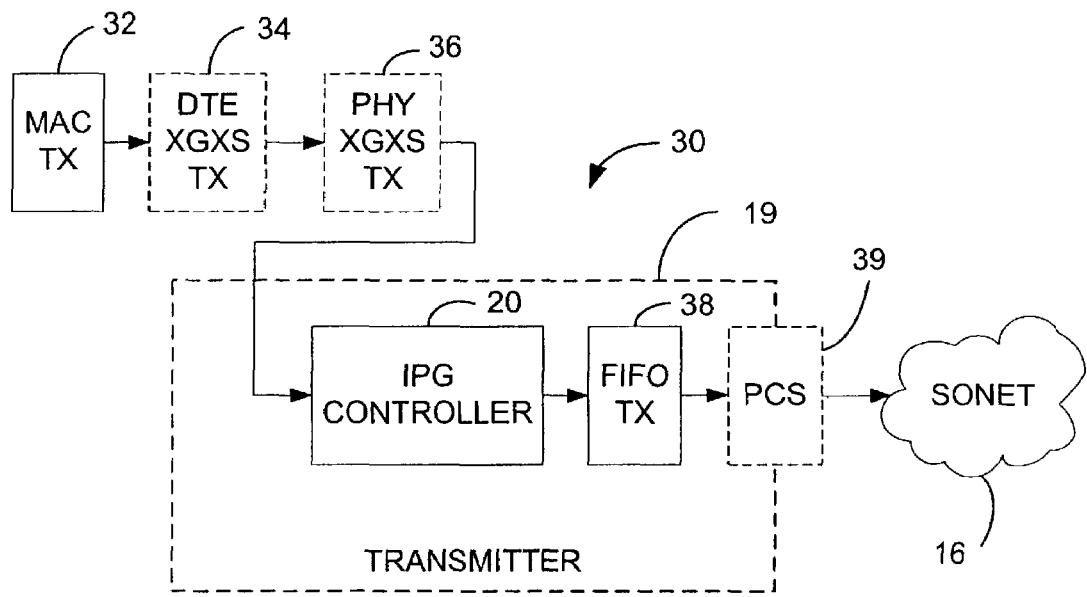
FIG. 2 is a block diagram of a transmitter.

FIG. 2 shows an aspect of a transceiver 30 to interface between a 10 GbE network and a SONET network. The transceiver 30 may receive transmission signals from a transmit Media Access Controller (MAC) 32 to implement the protocol in accordance with the IEEE 802.3ae standards. The transmit MAC 32 may stretch the IPG and add extra IPG before transmitting the packets as 10 Gigabit Media Independent Interface (XGMII) words. The IPG may be inserted to adjust the data rate and the clock rate differences between the Ethernet and SONET data streams. The XGMII is organized into 4 lanes of 8 bits. In an exemplary system, the MAC 32 may stretch the IPG by a stretch ratio of 104 bits in addition to a minimum IPG of 12 octets. For every 104 bits of packet that is sent, the MAC may stretch the IPG by one byte so that sending 13 bytes of data will result in stretching the IPG by one IPG byte.

A transmit data termination equipment XAUI Interface extended sublayer (DTE XGXS) 34 and a transmit Physical Layer (PHY) XGXS 36 may be included to extend the distance of the XGMII interconnect. The DTE XGXS 34 converts the XGMII to a XAUI interface. The XAUI is a full duplex interface that uses 4 self-clocked serial differential links in each direction to achieve 10 Gbit per second data throughput. Each serial link operates at 3.125 Gbit/sec to accommodate both data and the overhead associated with 8B/10B coding. The PHY XGXS 36 converts the XAUI back to XGMII.

An IPG controller 20 may monitor a stream of XGMII words flowing into a transmit First-In-First-Out (FIFO) 38 and selectively delete IPGs. The IPG controller may operate on the stream of XGMII words flowing from the MAC 32 or, if an extended interface 34 and 36 is used, flowing from the PHY XGXS 36. The IPG controller 20 may delete a sufficient number of IPGs to prevent the transmit FIFO 38 from overflowing. However, the IPG controller 20 does not delete IPGs either randomly or excessively that would cause packets to be transmitted back-to-back.

Figure 3:
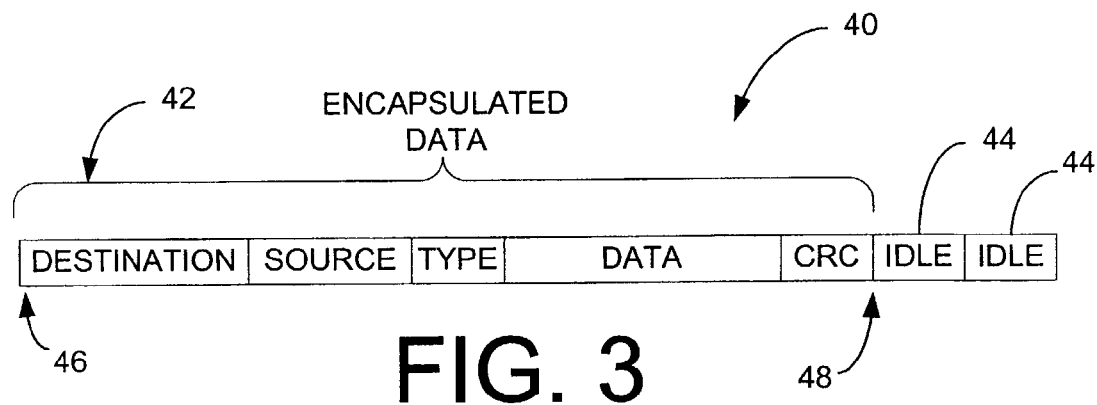
FIG. 3 is an illustration of a packet.

FIG. 3 shows a portion of a data stream 40 flowing from the transmit MAC 32. The data stream includes MAC encapsulated packets of data 42 separated by one or more IPG 44. The MAC encapsulated packets of data 42 may include a start character 46 and a termination character 48.

The transmit FIFO 38 may buffer the packet data and reconcile frequency differences between the Ethernet and SONET networks. The transmit FIFO 38 is preferably 72 bits wide to account for 32 data bits plus 4 control bits for the XGMII interface times 2. The depth of the transmit FIFO 38 may be set to be deep enough to absorb incoming data while the SONET overhead is transmitted. A Physical Coding Sublayer (PCS) 39, in communication with the transmit FIFO 38, may encapsulate and send the reformatted packet data over the SONET network 16.

Figure 4:
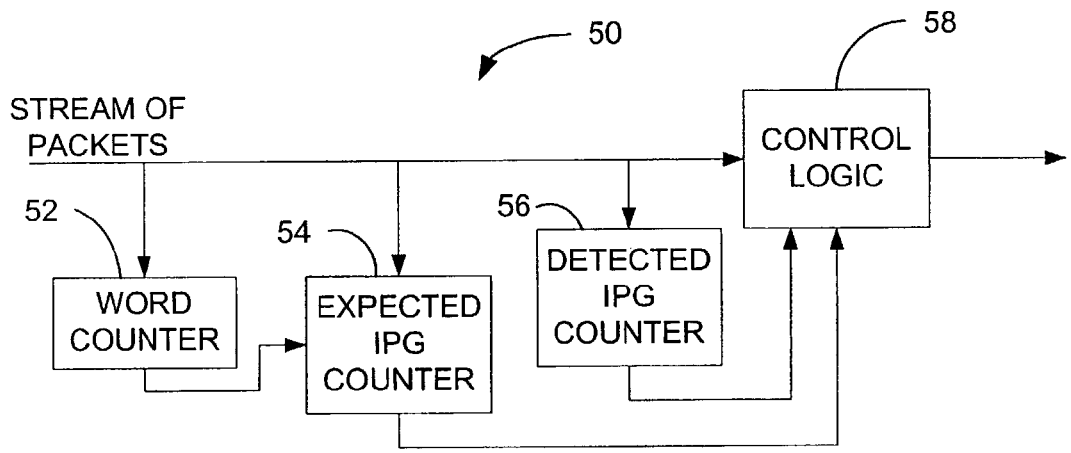
FIG. 4 is a block diagram of an embodiment of an Inter-Packet Gap (IPG) Controller.

FIG. 4 shows a first embodiment of an IPG controller 50 for controlling IPG in a data stream. The IPG controller 50 may be used in any transmitter, however the IPG controller 50 is particularly suitable for operating in a system that does not include an extended interface between the transmit MAC and the IPG controller 50.

A word counter 52 may count the number of data or Q characters beginning from a start character 46 of a packet. Q characters may be inserted into the data stream by the MAC 32 to indicate a fault or combination of faults. The word counter may output an increment signal every time the count reaches a predetermined count. The count is selected based on the stretch ratio. With a stretch ratio of 104 bits, the word counter is analogous to a modulo 13 counter so that the increment signal is output when the count reaches 13. In this case, '0' is the reset value, it denotes 0 data received. The increment signal increments an expected IPG (EIPG) counter 54. The word counter 52 may retain the remainder from counting the data or Q characters of preceding packets.

The EIPG counter 54 may determine the expected number of IPG. The EIPG counter 54 is reset to a predetermined initial EIPG when a start character 46 is detected. The initial EIPG may be set to the minimum number of IPG required. The minimum number of IPG required may be 12 octets, i.e. 3 XGMII words (12/4=3) at the output of the MAC.

A detected IPG (DIPG) counter 56 may count IPG words that follow the encapsulated data 42. The DIPG counter 56 may be reset to zero when a start character 46 is detected.

Control logic 58 may monitor the data stream and delete any IPGs that follow the terminate character 48 up to the last idle pair. To determine whether to delete the last idle pair, the control logic 58 may compare the EIPG count to the DIPG count and delete IPGs based on the comparison. For example, if the EIPG count is less than the DIPG count, then the last pair of IPG is not deleted. If the EIPG count is equal to the DIPG count, then a toggle flag may be set so that the last idle pair is deleted every other occurrence. If the EIPG count is greater than the DIPG count, then the last pair of IPG may be deleted or a predetermined proportion of the last pair of IPG may be deleted such as 50%. The predetermined proportion may range from substantially 0% to 100%. The control logic 58 may include a multi-stage pipeline such as a two-stage pipeline to delay the data stream during the determination. The following psuedocode illustrates one implementation of the logic for determining whether to delete the last idle pair.

If (EIPG_count DIPG_count)
Foweflag=oweflag;
Else if (EIPG_count>DIPG_count)
Foweflag=1'b0;
Else foweflag=1'b1;
Where oweflag indicates whether the last idle pair was deleted the last time.

Foweflag determines whether an extra delete is required;
If Foweflag=1, then don't delete more IPG,
If Foweflag=0, then delete more IPG to adjust the data rate and to avoid overflow.

The operation of the control logic 58 on the XGMII formatted data stream flowing to the transmit FIFO may be described as essentially four cases. Here, D is data, T is a terminate character, S is a start character, and I is an idle.

For Case 1a the data stream is DT, II, II . . . II, SD. Here, all of the II (idle pairs) may be deleted except for the last idle pair.

For Case 1b the data stream is DT, II, II, . . . II, IS. Here, a decision has to be made whether to delete the last idle pair.

For Case 2a the data stream is TI, II, II, . . . II, IS. Here all of the idle pairs may be deleted as well as the final idle pair.

For Case 2b the data stream is TI, II, II, . . . II, SD. Here, a decision has to be made whether to delete the last idle pair.

For Cases 1b and 2b the control logic determines whether to delete more IPG or leave the IPG separation between the packet intact thereby helping the downstream logic in the receiver FIFO.

Figure 5:
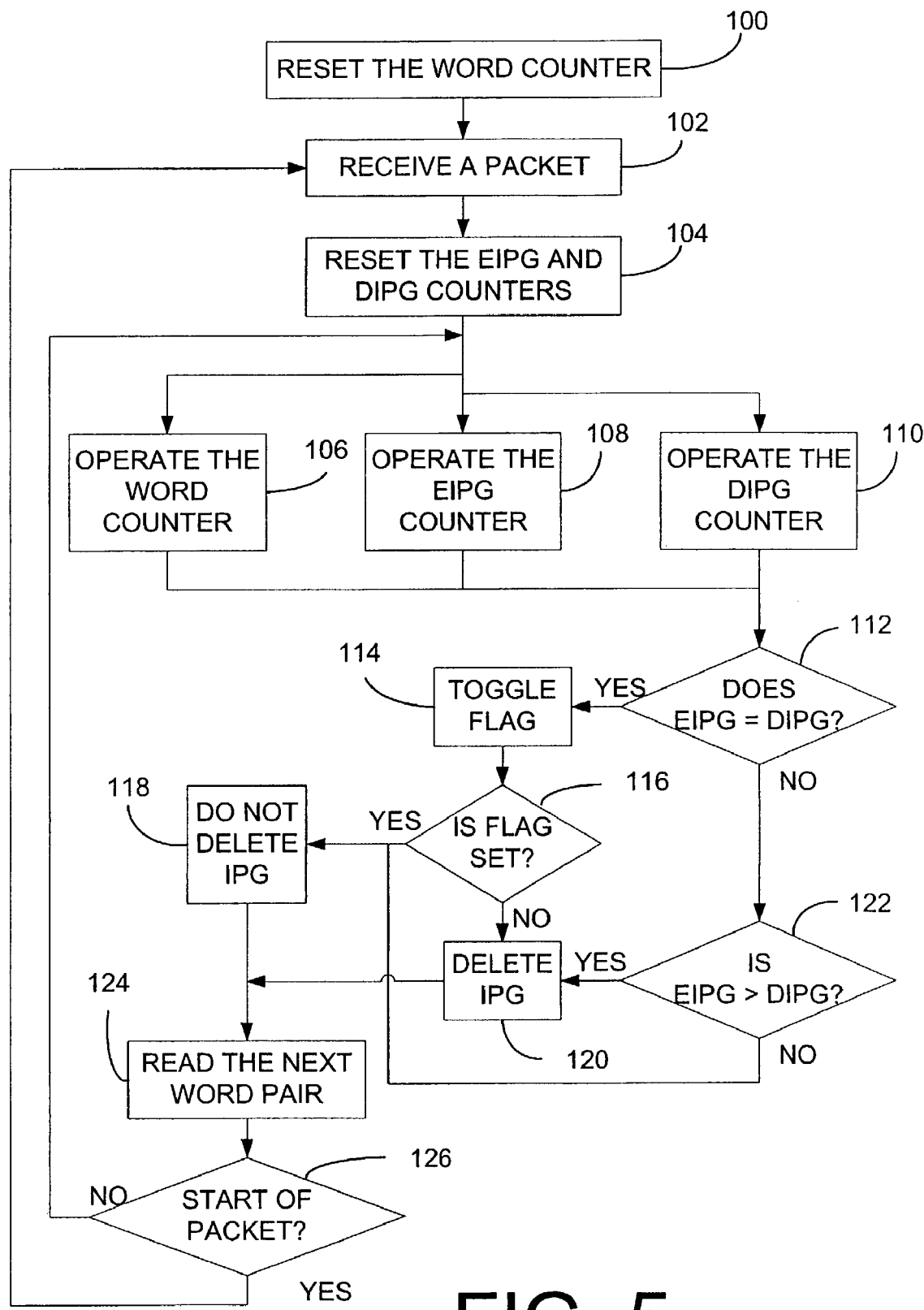
FIG. 5 is a flow diagram of an operation for deleting IPG.

FIG. 5 shows a flow diagram of an operation for selectively deleting IPG in a data stream. Starting at block 100 the word counter may be reset to zero. The word counter is preferably not reset on a packet-by-packet basis, instead retaining a remainder in the word count from packet-to-packet. Continuing to blocks 102 and 104, a packet in the data stream is received and the EIPG and DIPG counters are reset. At blocks 106, 108, and 110 the word counter, EIPG counter, and DIPG counter may operate on the data stream.

Figure 6:
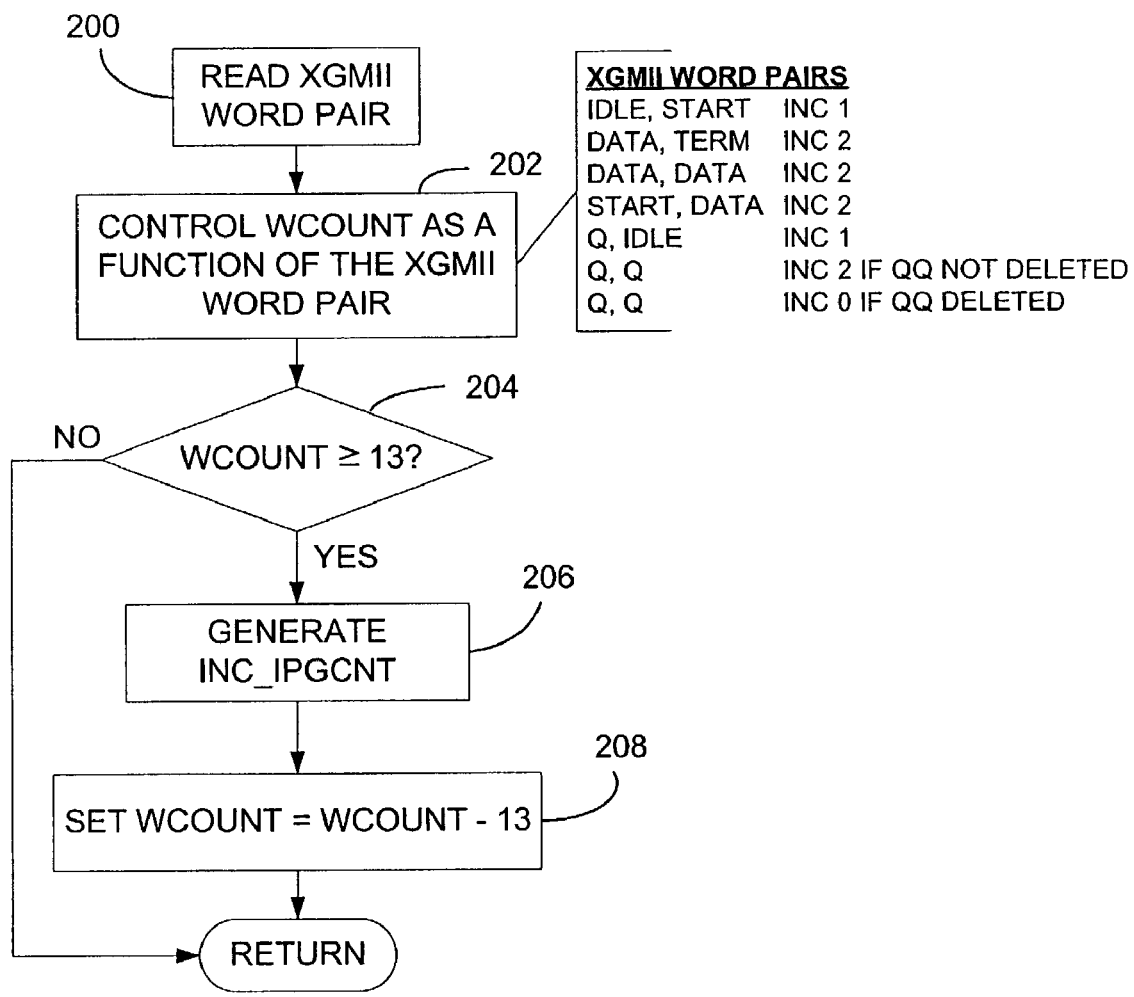
FIG. 6 is a flow diagram of an operation for a word counter.

FIG. 6 shows a detailed implementation of the word counter operation. At block 200 an XGMII word pair is read. Continuing to block 202, the word count is incremented as a function of the XGMII word pair. For example, if an "idle, start" word pair is detected, the word count, wcount, is incremented by 1. Continuing to block 204, the word count is tested to determine if the counter has reached 13 or greater. If the word count has not reached 13, then control returns to the main flow at block 112 (FIG. 5). If the word count, wcount, has reached 13, then continuing to block 206, an increment signal, INC_IPGCNT, is generated. At block 208, wcount is then set to remainder (wcount13) and control returns to the main flow at block 112 in FIG. 5.

Figure 7:
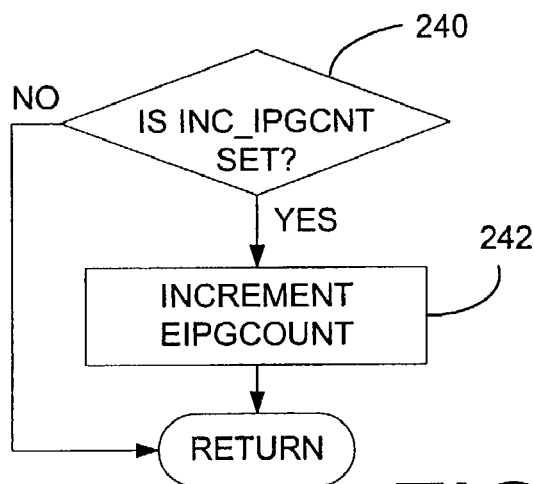
FIG. 7 is a flow diagram of an operation for an expected IPG counter.

FIG. 7 shows a detailed implementation of the EIPG counter operation. At block 240 the INC_IPGCNT is tested to determine if it is set. If INC_IPGCNT is set, then continuing to block 242 the EIPGCOUNT is incremented. Control then returns to the main flow at block 112 in FIG. 5.

Figure 8:
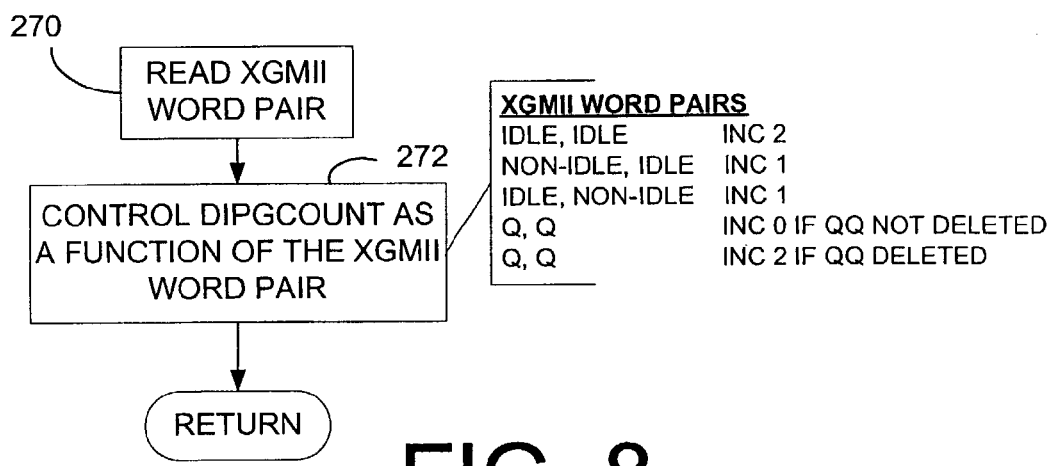
FIG. 8 is a flow diagram of an operation for a detected IPG counter.

FIG. 8 shows a detailed implementation of the DIPG counter operation. At block 270, an XGMII word pair is read. Continuing to block 272, the detected IPG count, DIPGCOUNT, is incremented as a function of the word pair. For example, for the word pair "idle, idle", DIPGCOUNT is incremented by 2. Control then returns to block 112 of FIG. 5.

At decision block 112 (FIG. 5), EIPG is compared to DIPG to determine if the expected IPG is equal to the detected IPG. Continuing to block 114, if the EIPG is equal to DIPG is equal a flag is toggled. At decision block 116, the flag is tested to determine if it is set. If the flag is set, then at block 118, the last pair of "idle, idle" are not deleted. If the flag is not set, then at block 120, the last pair of "idle, idle" is deleted. Returning to decision block 112, if EIPG is not equal to DIPG, then continuing to decision block 122, EIPG is compared to DIPG to determine if EIPG is greater than DIPG. If EIPG is greater than DIPG, then continuing to block 120, the IPG word pair is deleted. If EIPG is not greater than DIPG, then continuing to block 118, the IPG word pair is not deleted. Continuing to block 124, the next word pair is read. At decision block 126, the word pair is checked to determine if a start character is a part of the word pair. If a start character is not detected, then control returns to blocks 106, 108, and 110. If a start character is detected, then control returns to block 102 and the next packet in the data stream is received.

A number of embodiments of the invention have been described. Nevertheless, it will be understood that various modifications may be made without departing from the spirit and scope of the invention. Accordingly, other embodiments are within the scope of the following claims.

What is claimed is:

1. A device for controllably deleting interpacket gaps in a data stream of packets, the device comprising:
a transmitter, in communication with a Medium Access Controller (MAC), to receive the data stream of packets;
a controller to monitor the data stream of packets and to selectively delete interpacket gaps; and
a transmit buffer to buffer packet data in the data stream of packets flowing from the controller,
wherein the controller includes:
an expected interpacket gap (EIPG) counter to determine a quantity of expected interpacket gaps associated with each packet;
a detected interpacket gap (DIPG) counter to count a number of detected interpacket gaps associated with each packet; and
control-logic to compare the quantity of expected interpacket gaps to the number of detected interpacket gaps and to delete interpacket gaps as a function of the comparison.

2. The device of claim 1 wherein the interpacket gaps include last idle-idle pairs associated with each of the packets; and
the controller to determine the last idle-idle pair associated with each of the packets and to delete a predetermined proportion of the last idle-idle pairs.

3. The device of claim 2 wherein the predetermined proportion of the last idle-idle pairs is 50%.

4. The device of claim 2 wherein the predetermined proportion of the last idle-idle pairs is in a range of substantially 0% to 100%, the predetermined proportion being a function of the data stream of packets.

5. The device of claim 1 wherein the interpacket gaps include last idle-idle pairs associated with each of the packets; and
wherein the control logic to delete interpacket gaps preceding the last idle-idle pairs.

6. The device of claim 5 wherein the control logic to delete the last idle-idle pairs as a function of the comparison between the quantity of expected interpacket gaps and the number of detected interpacket gaps.

7. The device of claim 6 wherein the control logic includes an oweflag to indicate whether a previous last idle-idle pair was deleted.

8. The device of claim 1 wherein the data stream is compliant with an Ethernet standard.

9. An Ethernet transmitter comprising the device of claim 1.

10. A device for controllably deleting interpacket gaps in a data stream of packets, the device comprising:
means for receiving the data stream of packets;
controlling means for controlling a quantity of interpacket gaps in the data stream of packets; and
means for buffering packet data in the data stream of packets flowing from the controlling means,
wherein the controlling means includes:
first means for counting a quantity of expected interpacket gaps associated with each packet;
second means for counting a number of detected interpacket gaps associated with each packet; and
comparing means for comparing the quantity of expected interpacket gaps to the number of detected interpacket gaps and deleting interpacket gaps as a function of the comparison.

11. The device of claim 10 wherein the interpacket gaps include last idle-idle pairs associated with each of the packets; and
the controlling means to determine the last idle-idle pair associated with each of the packets and to delete a predetermined proportion of the last idle-idle pairs.

12. The device of claim 11 wherein the predetermined proportion of the last idle-idle pairs is 50%.

13. The device of claim 11 wherein the predetermined proportion of the last idle-idle pairs is in a range of substantially 0% to 100%, the predetermined proportion being a function of the data stream of packets.

14. The device of claim 10 wherein the interpacket gaps include last idle-idle pairs associated with each of the packets; and
wherein the comparing means delete excess interpacket gaps preceding the last idle-idle pairs.

15. The device of claim 14 wherein the comparing means deletes the last idle-idle pairs as a function of the comparison between the quantity of expected interpacket gaps and the number of detected interpacket gaps.

16. The device of claim 15 wherein the comparing means includes an oweflag to indicate whether a previous last idle-idle pair was deleted.

17. The device of claim 10 wherein the data stream is compliant with an Ethernet standard.

18. The device of claim 10 included in an Ethernet transmitter.

19. A method for controllably deleting interpacket gaps in a data stream of packets, the method comprising:
receiving the data stream of packets;
selectively deleting a quantity of interpacket gaps in the data stream of packets;
buffering packet data in the data stream of packets;
reformatting the interpacket gaps; and
transmitting the reformatted interpacket gaps with packet data,
wherein selectively deleting a quantity of interpacket gaps in the data stream of packets includes:
determining a quantity of expected interpacket gaps associated with each packet;
counting a number of detected interpacket gaps associated with each packet;
comparing the quantity of expected interpacket gaps to the number of detected interpacket gaps; and
deleting interpacket gaps based on the comparison of the quantity of expected interpacket gaps to the number of detected interpacket gaps.

20. The method of claim 19 wherein the interpacket gaps include last idle-idle pairs associated with each of the packet, and the method further includes:
determining the last idle-idle pair associated with each of the packets; and
deleting a predetermined proportion of the last idle-idle pairs.

21. The method of claim 20 wherein the predetermined proportion of the last idle-idle pairs is 50%.

22. The method of claim 20 wherein the predetermined proportion of the last idle-idle pairs is in a range of substantially 0% to 100%; the predetermined proportion being a function of the data stream of packets.

23. The method of claim 19 wherein the interpacket gaps include last idle-idle pairs associated with each of the packets; and
wherein deleting interpacket gaps includes deleting interpacket gaps preceding the last idle-idle pairs.

24. The method of claim 23 further including deleting the last idle-idle pairs as a function of the comparison of the quantity of expected interpacket gaps and the number of detected interpacket gaps.

25. The method of claim 24 further including setting an oweflag to indicate whether a previous last idle-idle pair was deleted.

26. The method of claim 19 wherein the data stream is compliant with an Ethernet standard.

27. The method of claim 19, wherein the method is performed by an Ethernet transmitter.

* * * * *